3,265,563
PHENYL N-ALKYL THIOLCARBAMATE
MICROBIOCIDE
Harry Tilles, El Cerrito, and Thomas B. Williamson, Santa Clara, Calif., assignors to Stauffer Chemical Company, New York, N.Y., a corporation of Delaware
No Drawing. Original application May 1, 1961, Ser. No. 106,445. Divided and this application Oct. 21, 1963, Ser. No. 320,245
10 Claims. (Cl. 167—30)

This application is a division of application Serial No. 106,445, filed May 1, 1961, now abandoned.

This invention relates to the use of such compounds as microbiocides.

More specifically, the invention relates to compounds of the formula:

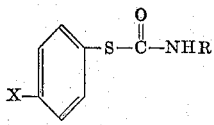

wherein R is a lower alkyl group and X is hydrogen or chlorine.

The compounds of the present invention have been tested and are particularly useful as bactericides and fungicides.

The following illustrative examples demonstrate the methods which may be employed to make typical compounds of the present invention.

*Example I.—Compound 6: p-Chlorophenyl N-ethylthiolcarbamate*

A 5 l. 3 neck flask was provided with stirrer, thermometer and addition funnel. 538 g. (2.60 moles) of p-chlorophenyl chlorothiolformate, 1000 cc. of ethyl ether and 1250 cc. of water were charged to the flask and the mixture was cooled to 2° C. 342 g. (5.33 moles) of 70% aqueous ethylamine solution was then carefully added, maintaining the temperature between 1.5–3.5° C. with external cooling. After completion of the addition, the mixture was stirred for an additional 48 minutes at 3–9° C. It was then transferred to a 4 l. beaker and the mixture was heated to 58° C. on the steam bath in order to remove the ether. The solid was then filtered and reslurried in 2 l. of water. It was then filtered and dried.

The crude product, M.P. 98.5–108° C., wt.=526 g., was recrystallized twice from isoheptane. There was obtained 433 g. (77.0% yield) of p-chlorophenyl N-ethylthiolcarbamate, M.P. 109.5–111.5° C.

*Analysis.*—Calculated for $C_9H_{10}ClNOS$: N, 6.49%; Cl, 16.44%. Found: N, 6.26%; Cl, 16.44%.

*Example II.—Compound 7: p-Chlorophenyl N-n-propylthiolcarbamate*

When the general procedure of Example I was repeated except that 327 g. (5.54 moles) of n-propylamine, 560 g. (2.70 moles) of p-chlorophenyl chlorothiolformate, 1000 cc. of ethyl ether and 1250 cc. of water were employed, there was obtained 515 g. (83.1% yield) of p-chlorophenyl N-n-propylthiolcarbamate, M.P. 96.0–98.0° C.

*Analysis.*—Calculated for $C_{10}H_{12}ClNOS$: N, 6.10%; Cl, 15.43%. Found: N, 6.0%; Cl, 15.2%.

*Example III.—Compound 8: p-Chlorophenyl N-n-butylthiolcarbamate*

When the general procedure of Example I was repeated except that 404 g. (5.54 moles) of n-butylamine, 560 g. (2.70 moles) of p-chlorophenyl chlorothiolformate, 1000 cc. of ethyl ether and 1250 cc. of water were employed, there was obtained 560 g. (85.2% yield) of p-chlorophenyl N-n-butylthiolcarbamate, M.P. 79–84° C.

*Analysis.*—Calculated for $C_{11}H_{14}ClNOS$: N, 5.75%; Cl, 14.55%. Found: N, 5.9%; Cl, 14.4%.

*Example IV.—Compound 5: p-Chlorophenyl N-allylthiolcarbamate*

10 g. (0.048 mole) of p-chlorophenyl chlorothiolformate was dissolved in 125 cc. of ethyl ether and cooled in an ice bath. 5.6 g. (0.099 mole) of allylamine was then slowly added with cooling. A precipitate of allylamine hydrochloride formed immediately. The solid was filtered and the filtrate was concentrated on the steam bath. There remained behind, 8.3 g. (75.5% yield) of p-chlorophenyl N-allylthiolcarbamate, M.P. 109.5–112.5° C.

*Example V.—Compound 2: Phenyl N-ethylthiolcarbamate*

7.7 g. (0.119 mole) of 70% ethylamine solution, 50 cc. of ethyl ether and 50 cc. of water were added to a 3-neck 200 cc. flask provided with stirrer and thermometer and the mixture was cooled to 5° C. 10 g. (0.058 mole) of phenyl chlorothiolformate was then added slowly with cooling. After the addition was completed, the ether layer was then separated from the aqueous layer and washed with 1–50 cc. portion of water. It was then dried over anhydrous magnesium sulfate and evaporated on the steam bath. There remained behind, 6.4 g. (61% yield) of phenyl N-ethylthiolcarbamate, M.P. 69.0–76.0° C.

*Example VI.—Compound 3: Phenyl N-n-propylthiolcarbamate*

When the general procedure of Example IV was repeated except that 7.0 g. (0.119 mole) of n-propylamine, 10 g. (0.058 mole) of phenyl chlorothiolformate and 125 cc. of ethyl ether were employed, there was obtained 10.3 g. (91.1% yield) of phenyl N-n-propylthiolcarbamate, M.P. 70.5–75.0° C.

*Example VII.—Compound 4: Phenyl N-n-butylthiolcarbamate*

When the general procedure of Example IV was repeated except that 8.7 g. (0.119 mole) of n-butylamine, 10 g. (0.058 mole) of phenyl chlorothiolformate and 125 cc. of ethyl ether were employed, there was obtained 11.9 g. (100% yield) of phenyl N-n-butylthiolcarbamate, $n_D^{27.5}$ 1.5547.

*Example VIII.—Compound 1: Phenyl N-allylthiolcarbamate*

When the general procedure of Example IV was repeated except that 6.8 g. (0.119 mole) of allylamine, 10 g. (0.058 mole) of phenyl chlorothiolformate and 125 cc. of ethyl ether were employed, there was obtained 11.1 g. (99.2% yield) of phenyl N-allylthiolcarbamate, $n_D^{25}$ 1.5828.

The compounds of the present invention were used in various tests which will hereinafter be described.

*In vitro test.*—This test measures the fungicidal and bactericidal properties of the compounds being tested when in contact with a growing fungus or bacterium in an artificial medium.

The compounds to be tested are each placed in a vial of malt broth at various rates expressed in parts per million. Next, water suspensions of spores of *Aspergillus niger*, *Sclerotinia fructicola*, and *Stemphylium Sp.* are added to the vials to test the fungicidal activity of the compounds. Cells of *Staphylococcus aurcus*, *Erwinia amylovora*, and *Escherichia coli* are added (one organism per vial) to test bactericidal activity. One week later the results are read.

*Agar plate fumigation test.*—This test indicates whether or not a compound has a fungicidal vapor phase.

Approximately 0.1 gram of compound is placed in a 0.5 ml. microbeaker in a Petri dish of hardened potato dextrose agar. *Aspergillus niger* spores are dusted onto the agar and the dish is closed. One week later, growth of the fungus is recorded as percent control.

*Foliage fungicide test.*—This test indicates protectant action as well as eradicant and leaf systemic action against fungi attacking plant foliage.

Pinto bean plants are thoroughly sprayed with three concentrations of dissolved or suspended chemical in water. After drying, the plants are inoculated with rust or powdery mildew spores. Results are read when disease symptoms are distinct on untreated beans and reported in percent control. Northern corn was also treated in the same manner and infected with leaf blight.

*Nematocide soil incorporation test.*—This test determines a chemical's action on nematodes in the soil.

Soil is infested with root-knot nematodes and then treated with the test compounds. After leaving the soil sealed for 48 hours, tomatoes are planted as the indicator plant after allowing the soil to air out. The nematodes, if they survive, attack the roots and cause swellings or knots. These are observed four weeks after treatment.

The following table shows the results of the tests described supra.

wherein R is a member selected from the group consisting of lower alkyl and X is a member selected from the group consisting of hydrogen and chlorine.

2. The method as stated in claim 1 wherein R is ethyl.

3. The method as stated in claim 1 wherein R is n-propyl.

4. The method as stated in claim 1 wherein R is n-butyl.

5. The method as stated in claim 2 wherein X is hydrogen.

6. The method as stated in claim 3 wherein X is hydrogen.

7. The method as stated in claim 4 wherein X is hydrogen.

8. The method as stated in claim 2 wherein X is chlorine.

9. The method as stated in claim 3 wherein X is chlorine.

10. The method as stated in claim 4 wherein X is chlorine.

IN VITRO TESTS

| Compound No. | R | X | Aspergillus niger | Sclerotinia fructicola | Stemphylium sp. | (Bacteria) | | | Percent Agar Fum., |
|---|---|---|---|---|---|---|---|---|---|
| | | | | | | S. aureus | E. amylovora | E. coli | |
| 1 | Allyl | H | <50 | <50 | (100) | 25 | 25 | 50 | 95 |
| 2 | Ethyl | H | <50 | <50 | (100) | 25 | 25 | 25 | 20 |
| 3 | n-Propyl | H | <50 | <50 | (100) | 25 | 25 | 50 | 0 |
| 4 | n-Butyl | H | <50 | <50 | (100) | 25 | 25 | 25 | 90 |
| 5 | Allyl | Cl | (100) | <50 | >500 | | | | 0 |
| 6 | Ethyl | Cl | (50) | <50 | 100 | 10 | 10 | 10 | 0 |
| 7 | n-propyl | Cl | <50 | <50 | >500 | 10 | 5 | 10 | 0 |
| 8 | n-Butyl | Cl | <50 | <50 | (100) | 10 | 5 | 5 | 0 |

Numbers *in vitro* tests=complete control at that concentration in p.p.m. Parentheses indicate partial control at indicated rate.

FOLIAR TESTS

| Compound No. | R | X | Bean Rust | | | Bean Mildew | | | No. Corn Leaf Bl. | | | Root Knot Nemas |
|---|---|---|---|---|---|---|---|---|---|---|---|---|
| | | | 1,000 | 500 | 100 | 1,000 | 500 | 100 | 1,000 | 500 | 100 | |
| 1 | Allyl | H | 75 | 0 | 0 | d 0 | d 0 | 0 | | | | 0 |
| 2 | Ethyl | H | 0 | 0 | 0 | 0 | 0 | 0 | | | | 0 |
| 3 | n-Propyl | H | d 0 | 0 | 0 | d 0 | 0 | 0 | | | | 0 |
| 4 | n-Butyl | H | d 90 | 0 | 0 | d 50 | d 0 | 0 | | | | 0 |
| 5 | Allyl | Cl | 100 | 100 | 75 | 90 | 75 | 50 | 90 | 90 | 0 | 0 |
| 6 | Ethyl | Cl | d 100 | 90 | 0 | 90 | 90 | 0 | e 50 | 50 | 0 | (110) |
| 7 | n-Propyl | Cl | d 100 | 90 | 0 | 100 | 90 | 50 | 90 | 75 | 0 | 0 |
| 8 | n-Butyl | Cl | d 100 | 90 | 0 | 75 | 50 | 90 | 0 | 75 | 0 | (110) | d=slight phytotoxicity.
e=moderate phytotoxicity.

Parentheses indicate partial control at indicated rate.

As described in the examples hereinbefore given, the method for making the compounds of the present invention involves a substitution reaction in which a lower alkyl group of an alkyl amine is substituted for the chlorine atom of a phenyl chlorothiolformate. This reaction is carried out in the presence of ethyl ether or equivalent solvents.

Throughout the specification, the term "lower alkyl group" is meant to include an allyl group although strictly speaking it is an alkylene group.

We claim:

1. The method of controlling microorganisms comprising contacting the pest habitat with a compound of the following formula:

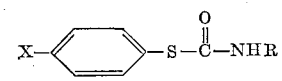

References Cited by the Examiner

UNITED STATES PATENTS 2,977,209    3/1961    Tilles _____ 260—455
2,990,319    6/1961    Jones _____ 167—30
3,098,001    7/1963    Werres _____ 167—30

FOREIGN PATENTS 961,042    3/1957    Germany.

OTHER REFERENCES

Chemical Abstracts, 55: 14822(c) (1961), abstracting Arch. Pharm. (Berl), vol. 294, No. 66, pp. 201 to 209, April 1961.

JULIAN S. LEVITT, *Primary Examiner.*

J. D. GOLDBERG, *Assistant Examiner.*